United States Patent
Koo

(10) Patent No.: US 8,794,807 B2
(45) Date of Patent: Aug. 5, 2014

(54) VEHICLE LAMP STEERING MECHANISM USING GEAR TRANSMISSION

(75) Inventor: Ting-Yi Koo, Chang Hua County (TW)

(73) Assignee: Tricore Corporation, Chang Hua County (TW)

( * ) Notice: Subject to any disclaimer, the term of this patent is extended or adjusted under 35 U.S.C. 154(b) by 167 days.

(21) Appl. No.: 13/537,813

(22) Filed: Jun. 29, 2012

(65) Prior Publication Data

US 2013/0229819 A1 Sep. 5, 2013

(51) Int. Cl.
*F21V 33/00* (2006.01)
*B60Q 1/04* (2006.01)
*B60Q 1/12* (2006.01)

(52) U.S. Cl.
CPC ............... *B60Q 1/045* (2013.01); *B60Q 1/122* (2013.01)
USPC ............................ 362/524; 362/287; 362/372

(58) Field of Classification Search
USPC .......................... 362/524, 525, 285, 287, 372
See application file for complete search history.

(56) References Cited

U.S. PATENT DOCUMENTS

| | | | |
|---|---|---|---|
| 6,648,494 B2 | 11/2003 | Sugimoto et al. | |
| 6,955,447 B2 * | 10/2005 | Lui | 362/233 |
| 7,658,522 B2 * | 2/2010 | Kuwahara et al. | 362/524 |
| 7,674,022 B2 * | 3/2010 | Nakano et al. | 362/473 |
| 2008/0089086 A1 * | 4/2008 | Tajima et al. | 362/524 |
| 2008/0112181 A1 * | 5/2008 | Tatara et al. | 362/524 |
| 2011/0188258 A1 * | 8/2011 | Tajima | 362/524 |

* cited by examiner

*Primary Examiner* — Laura Tso
(74) *Attorney, Agent, or Firm* — Bacon & Thomas, PLLC

(57) ABSTRACT

A vehicle lamp steering mechanism includes an output gear providing an eccentric block, a housing, a light source having an eccentric shaft connected to the eccentric block of the output gear, a transmission gear set, and a driving device for driving the transmission gear set to rotate the output gear in biasing the light source, thereby adjusting the illumination angle of the light source. By means of arranging the light source and the output gear in a coaxial relationship, the output torque of the output gear is fully reflected in the biasing of the light source, enhancing transmission efficiency.

8 Claims, 6 Drawing Sheets

VEHICLE LAMP STEERING MECHANISM USING GEAR TRANSMISSION

BACKGROUND OF THE INVENTION

1. Field of the Invention

The present invention relates to radiation direction adjustable vehicle lamps and more particularly, to a vehicle lamp steering mechanism, which uses a step motor to drive gears, achieving adjustment of the radiation direction of a vehicle lamp.

2. Description of the Related Art

Using gear transmission driving means for biasing a vehicle lamp is known. U.S. Pat. No. 6,648,494 discloses a vehicle lamp, entitled "Vehicle lamp and rotary driving apparatus", which includes a light source means, a power source means and a transmission unit. The transmission unit comprises a first gear, a second gear, a third gear, a driving gear, a pivot means and a connection plate. The power source is a motor for moving the first gear, the second gear, the third gear, the driving gear, the pivot means and the bracket to bias the light source means, thereby adjusting the irradiation angle of the light source means.

According to the aforesaid prior art design, the driving gear and the pivot means are not arranged in a coaxial relationship. When the driving gear drives the bracket to bias the pivot means, only a part of the driving force of the driving gear is transferred to the pivot means. Thus, the transmission efficiency of the transmission unit is not optimal. An improvement in this regard is necessary.

SUMMARY OF THE INVENTION

The present invention has been accomplished under the circumstances in view. It is the main object of the present invention to provide a vehicle lamp steering mechanism using gear transmission, which has the output gear and the light source arranged in a coaxial relationship so that the output torque of the output gear can be fully reflected in the biasing of the light source.

To achieve this and other objects of the present invention, a vehicle lamp steering mechanism comprises a housing, a light source, an output gear, a transmission gear set, and a driving device. The light source is rotatably mounted in the housing, comprising an eccentric shaft. The output gear is rotatably mounted in the housing, comprising an eccentric block connected with the eccentric shaft of the light source. The transmission gear set comprises at least one gearwheel and is meshed with the output gear. The driving device comprises an output shaft, and a pinion located on the output shaft and meshed with the transmission gear set. Further, the light source and the output gear are arranged in a coaxial relationship.

Further, the light source comprises a lamp body and a rotary bracket connected to said lamp body. The eccentric shaft is formed on the rotary bracket. The output gear comprises a body member and a connection member. The connection member is mounted at the body member. The body member comprises a toothed portion meshed with the transmission gear set. The eccentric block is formed on the connection member. The housing comprises an accommodation chamber adapted for accommodating the output gear and the transmission gear set, and a constraint hole adapted for receiving the eccentric block of the output gear. The transmission gear set comprises a first gearwheel and a second gearwheel. The first gearwheel comprises a large set of teeth and a small set of teeth arranged in a coaxial manner. The second gearwheel comprises a large set of teeth and a small set of teeth arranged in a coaxial manner. The large set of teeth of the second gearwheel is meshed with the small set of teeth of the first gearwheel. The small set of teeth of the second gearwheel is meshed with the output gear. The second gearwheel comprises a stop block located on the top side of the large set of teeth thereof. The lamp housing comprises a bottom plate, and a stop block located on the bottom plate for the stoppage of one of two opposite sides of the stop block of the second gearwheel.

The vehicle lamp steering mechanism further comprises a torsion spring, a spring leaf and a position sensor. The torsion spring has the two opposite ends thereof respectively fastened to the housing and the output gear. The eccentric block of the output gear defines therein a coupling hole for receiving the eccentric shaft of the light source. The spring leaf is stopped between the inside wall of the coupling hole and the eccentric shaft. The position sensor is mounted in the housing. The output gear comprises at least one sensible portion. The position sensor is adapted for sensing the position of the at least one sensible portion.

Other and further benefits, advantages and features of the present invention will be understood by reference to the following specification in conjunction with the accompanying drawings, in which like reference characters denote like elements of structure.

DETAILED DESCRIPTION OF THE INVENTION

Figure 1:
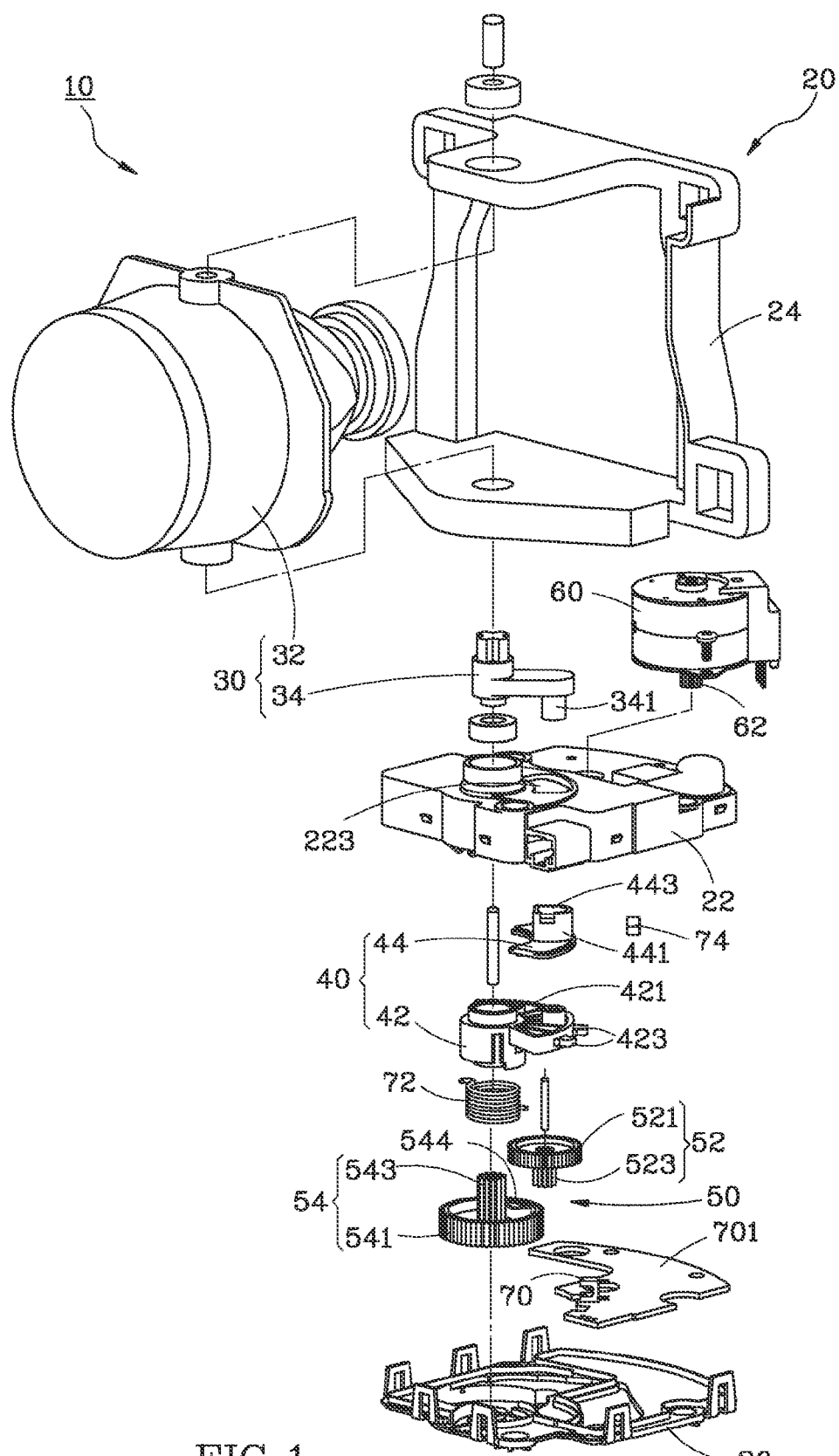
FIG. 1 is an exploded view of a vehicle lamp steering mechanism in accordance with the present invention.
Figure 2:
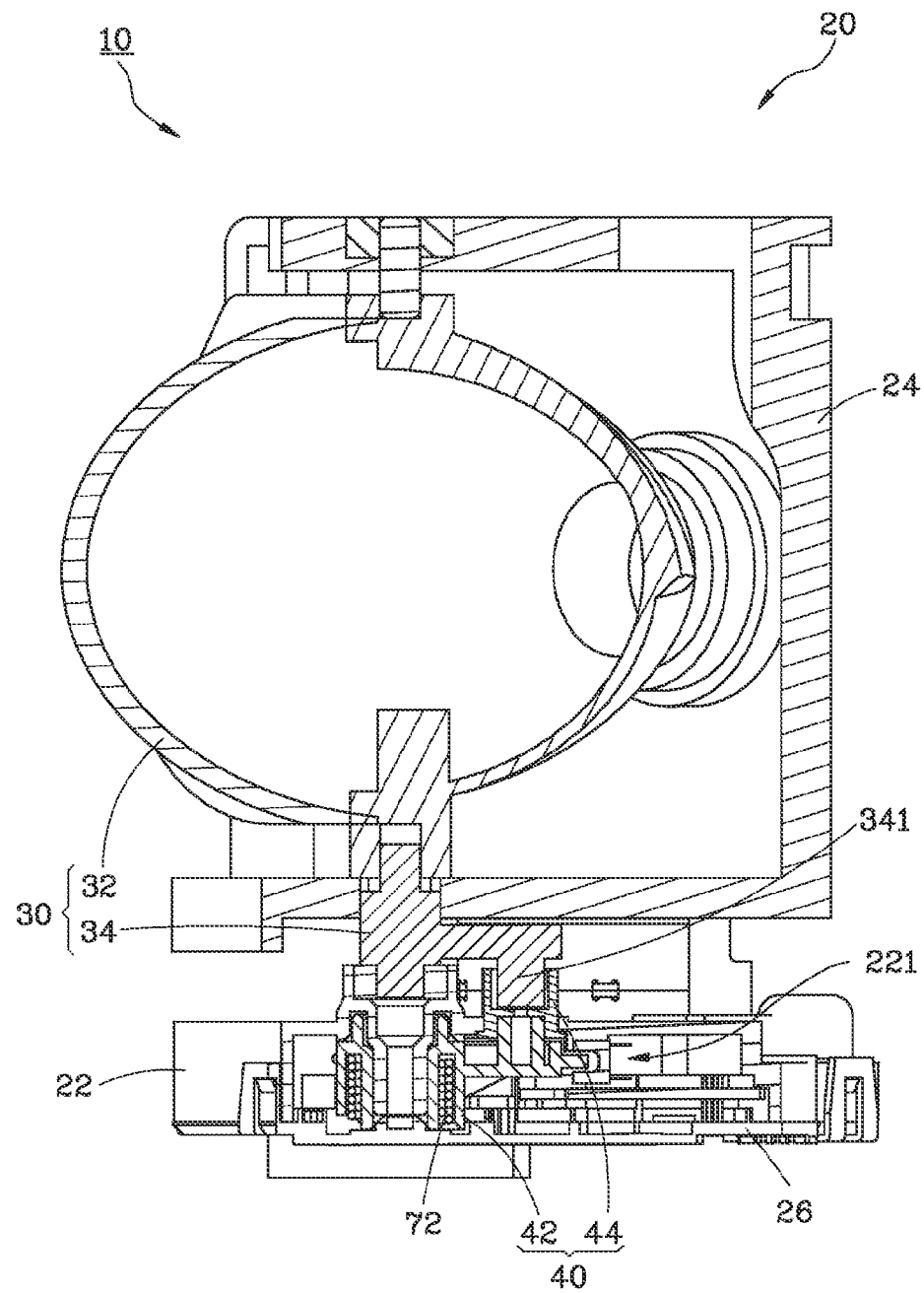
FIG. 2 is a sectional view of the vehicle lamp steering mechanism in accordance with the present invention.

Referring to FIGS. 1 through 4, a vehicle lamp steering mechanism 10 in accordance with the invention is shown. The vehicle lamp steering mechanism 10 comprises a lamp housing 20, a light source 30, an output gear 40, a transmission gear set 50, a driving device 60, a position sensor 70, a torsion spring 72 and a spring leaf 74.

The lamp housing 20 comprises a bottom plate 22, a holder frame 24 and a bottom cover 26. The holder frame 24 is arranged at the top side of the bottom plate 22. The bottom cover 26 is covered on the bottom side of the bottom plate 22. The bottom plate 22 and the bottom cover 26 defined therebetween an accommodation chamber 221 for accommodating the output gear 40 and the transmission gear set 50. The bottom plate 22 has a constraint hole 223 disposed in communication with the accommodation chamber 221.

The light source 30 is rotatably mounted in the lamp housing 20, comprising a lamp body 32 and a rotary bracket 34 supporting the lamp body 32. The rotary bracket 34 has one end thereof connected to the lamp body 32 and an opposite end thereof terminating in an eccentric shaft 341.

The output gear 40 is pivotally mounted in the lamp housing 20, comprising a body member 42 and a connection member 44. The body member 42 comprises a toothed portion 421 and two sensible portions 423. The connection member 44 is mounted at the body member 42, comprising an eccentric block 441 inserted into the constraint hole 223 of the bottom plate 22 of the lamp housing 20 and a coupling hole 443 defined in the eccentric block 441 and adapted for receiving the eccentric shaft 341 of the rotary bracket 34 of the light source 30 for enabling the output gear 40 to bias the lamp body 32 through the connection member 44 and the rotary bracket 34. The arrangement of the constraint hole 223 and the eccentric shaft 341 can also limit the range of oscillation of the output gear 40 and the light source 30. Further, the output gear 40 and the light source 30 are coaxially arranged together.

The transmission gear set 50 is mounted in the lamp housing 20, comprising a first gearwheel 52 and a second gearwheel 54. The first gearwheel 52 comprises a large set of teeth 521 and a small set of teeth 523. The second gearwheel 54 comprises a large set of teeth 541 and a small set of teeth 543. The large set of teeth 541 of the second gearwheel 54 is meshed with the small set of teeth 523 of the first gearwheel 52. The small set of teeth 543 of the second gearwheel 54 is meshed with the toothed portion 421 of the body member 42 of the output gear 40. Further, the second gearwheel 54 comprises a stop block 544 located on the top side of the large set of teeth 541. Further, the bottom plate 22 of the lamp housing 20 comprises a stop block 224 for the stoppage of one of the two opposite sides of the stop block 544 of the second gearwheel 54 to limit the angle of rotation of the second gearwheel 54.

The driving device 60 is mounted in the lamp housing 20 between the bottom plate 22 and the holder frame 24. According to the present preferred embodiment, the driving device 60 is a step motor comprising an output shaft 62 and a pinion 621 located on the output shaft 62 and meshed with the large set of teeth 521 of the first gearwheel 52 of the transmission gear set 50.

The position sensor 70 comprises a circuit board 701 mounted in the lamp housing 20 and adapted for sensing the position of the sensible portions 423 and converting the sensed data into an electric signal for output.

The torsion spring 72 is mounted inside the body member 42 of the output gear 40, having the two opposite ends thereof respectively fastened to the housing 20 and the output gear 40 to eliminate the gaps among the gear components 40,52,54, 621, enabling the rotational travel of the output shaft 62 of the driving device 60 to be fully reflected in the rotation of the output gear 40.

The spring leaf 74 is accommodated in the coupling hole 443 of the connection member 44 of the output gear 40, and stopped between the inside wall of the coupling hole 443 and the eccentric shaft 341 to eliminate the gap therebetween, assuring excellent uniformity of the rotational travel of the light source 30 and the output gear 40.

Figure 3:
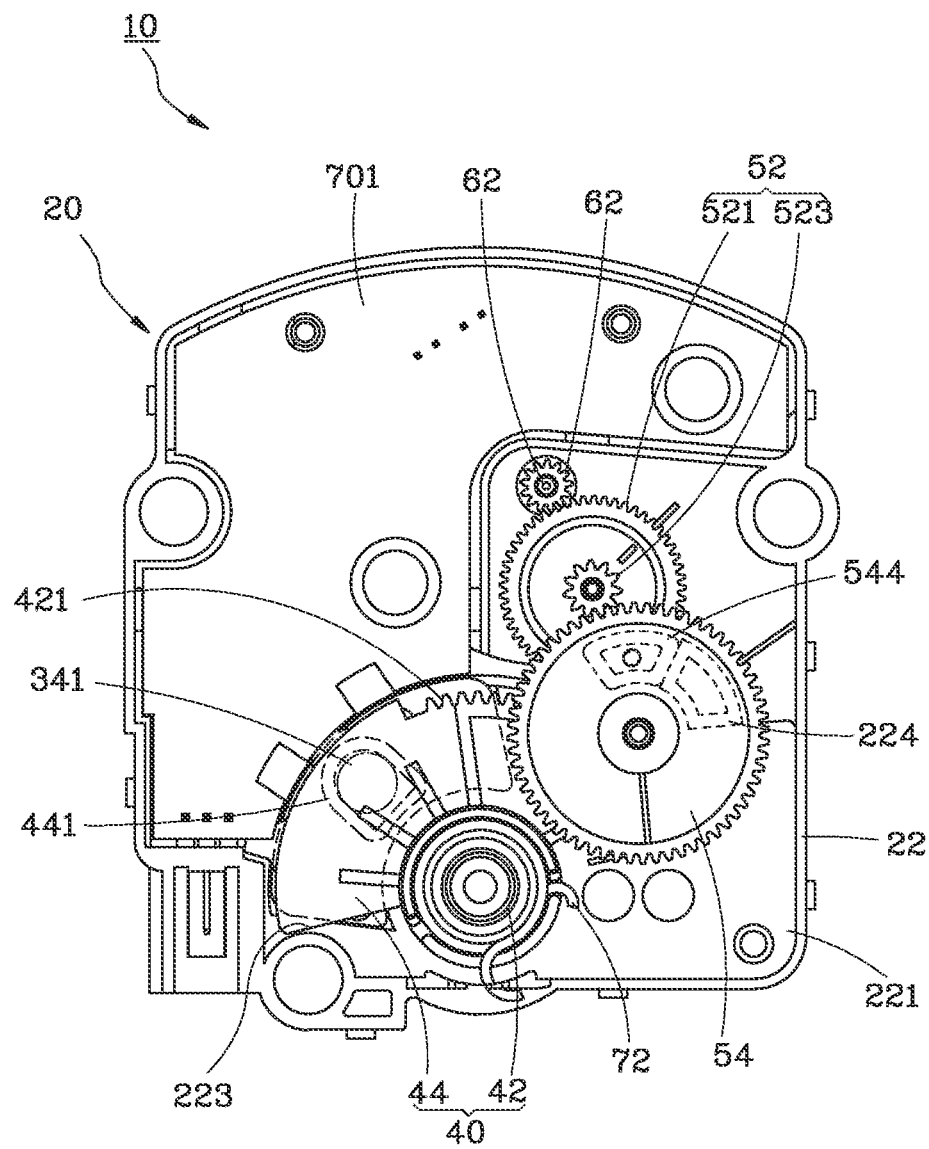
FIG. 3 is a bottom view of the vehicle lamp steering mechanism in accordance with the present invention after removal of the bottom cover.
Figure 4:
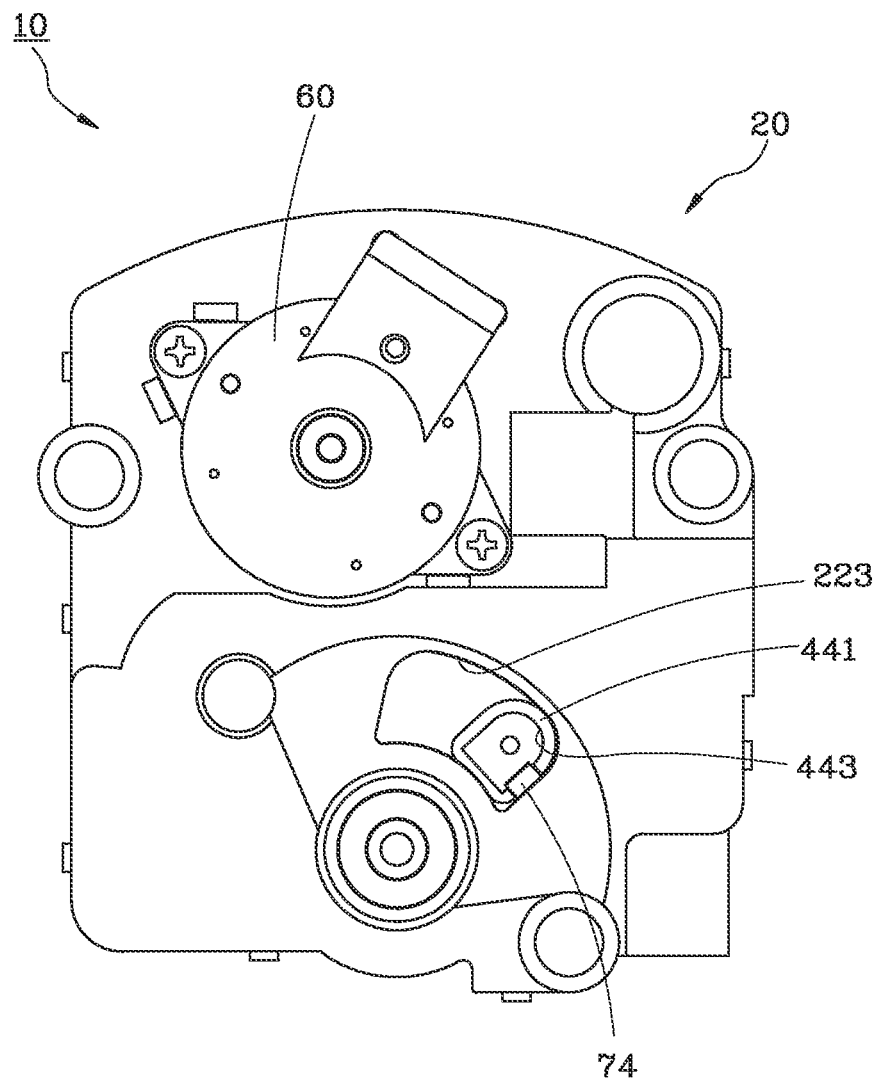
FIG. 4 is a plain view of the invention, illustrating the internal structure of the vehicle lamp steering mechanism.
Figure 5:
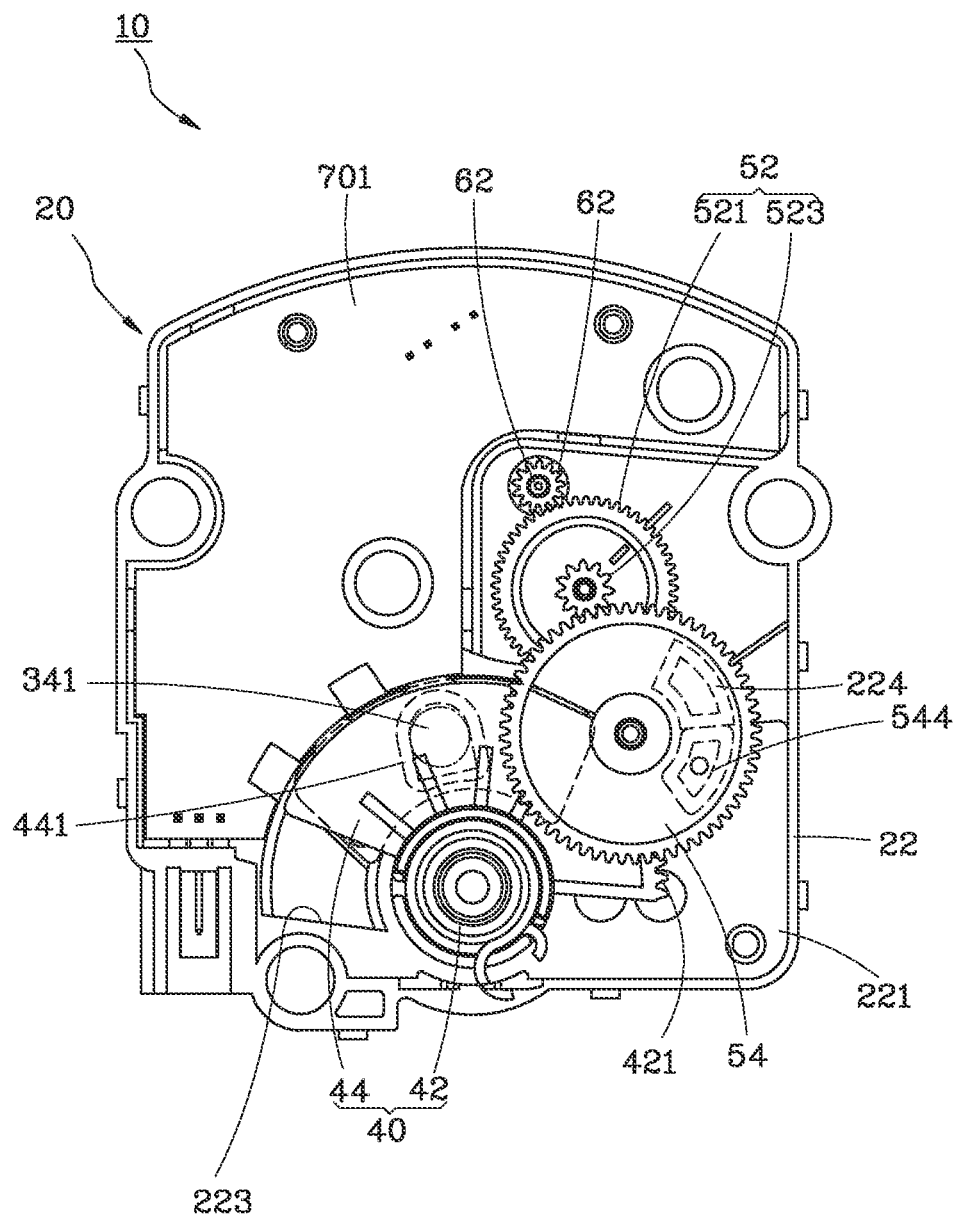
FIG. 5 is another bottom view of the vehicle lamp steering mechanism in accordance with the present invention after removal of the bottom cover, illustrating the angle of the output gear adjusted.
Figure 6:
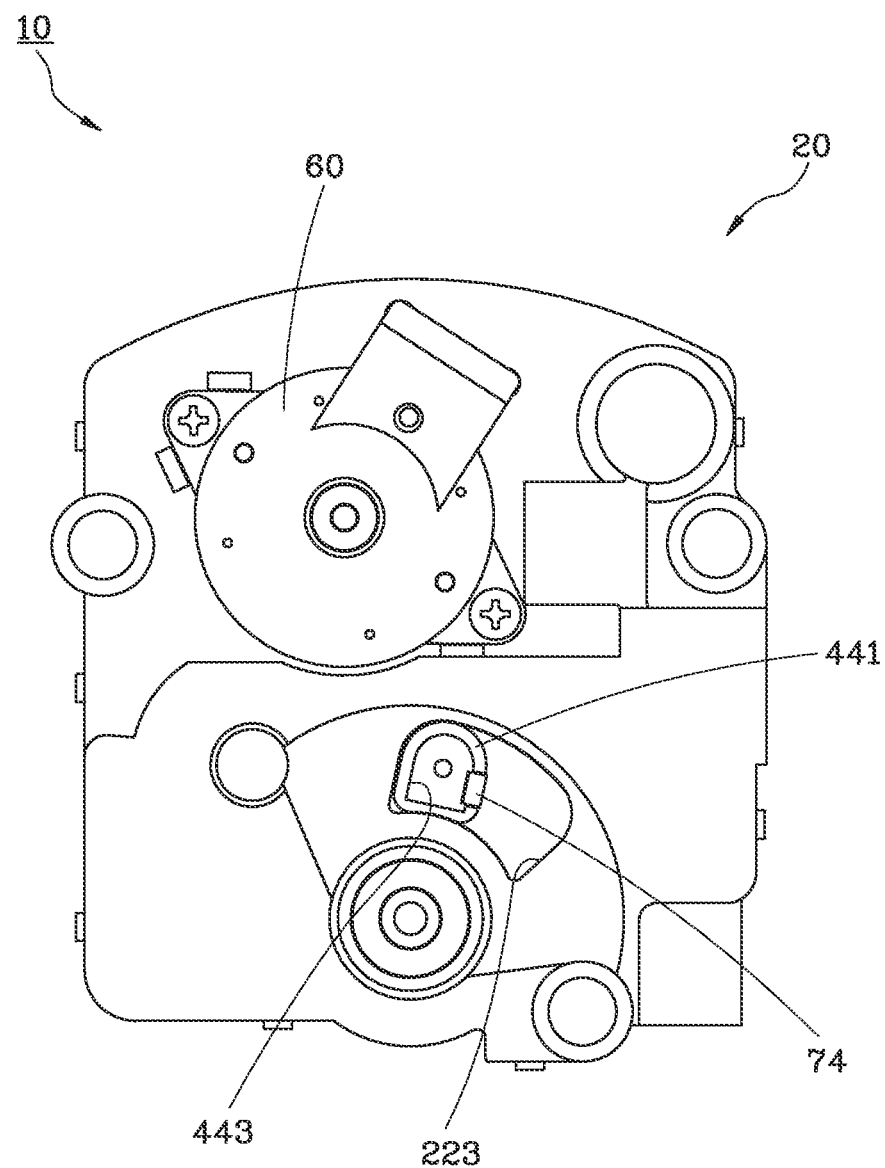
FIG. 6 is another plain view of the invention, illustrating the position of the eccentric block of the connection member of the output gear in the constraint hole adjusted.

When going to adjust the illumination direction of the light source 30, the user can directly operate the driving device 60 to rotate the first gearwheel 52 of the transmission gear set 50, driving the second gearwheel 54 to bias the rotary bracket 34 of the light source 30 through the body member 42 and connection member 44 of the output gear 40, and therefore the illumination direction of the lamp body 32 of the light source 30 is relatively adjusted. By means of limiting the angle of rotation of the second gearwheel 54, the rotary movement of the connection member 44 of the output gear 40 is controlled between a start point position and an end point position. FIG. 3 and FIG. 4 illustrate the second gearwheel 54 and the connection member 44 in the start point position. FIG. 5 and FIG. 6 illustrate the second gearwheel 54 and the connection member 44 in the end point position. Of course, the constraint hole 223 can also limit the angle of rotation of the connection member 44.

As the output gear 40 and the light source 30 are arranged in a coaxial manner, the output torque of the output gear 40 can be fully reflected in the biasing of the light source 30, minimizing the space required for allowing biasing of the related component parts. For the advantage of high transmission efficiency of the vehicle lamp steering mechanism 10, the driving device 60 can adopt a low power design to achieve the desired effect of biasing the light source 30. Further, there is a constant relationship between the light source 30 and the output gear 40, i.e., the biasing angle between the light source 30 and the output gear 40 exhibits a linear relationship, so that the user can control the biasing travel of the light source 30 easily.

Further, the lamp body 32 and rotary bracket 34 of the light source 30 can be made in integrity and the body member 42 and connection member 44 of the output gear 40 can also be made in integrity, achieving the same effects of biasing the light source 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle lamp steering mechanism, comprising:
   a housing;
   a light source rotatably mounted in said housing, said light source comprising an eccentric shaft;
   an output gear rotatably mounted in said housing, said output gear comprising an eccentric block connected with said eccentric shaft of said light source;
   a transmission gear set comprising at least one gearwheel, said transmission gear set being meshed with said output gear;
   a driving device comprising an output shaft and a pinion located on said output shaft and meshed with said transmission gear set;
   wherein said light source and said output gear are arranged in a coaxial relationship; and
   a position sensor mounted in said housing, wherein said output gear comprises at least one sensible portion; said portion sensor is adapted for sensing the position of said at least one sensible portion.

2. The vehicle lamp steering mechanism as claimed in claim 1, wherein said light source comprises a lamp body and a rotary bracket connected to said lamp body; said eccentric shaft is formed on said rotary bracket.

3. The vehicle lamp steering mechanism as claimed in claim 1, wherein said output gear comprises a body member and a connection member, said connection member being mounted at said body member, said body member comprising a toothed portion meshed with said transmission gear set; said eccentric block is formed on said connection member.

4. The vehicle lamp steering mechanism as claimed in claim 1, wherein said housing comprises an accommodation chamber adapted for accommodating said output gear and said transmission gear set, and a constraint hole adapted for receiving said eccentric block of said output gear.

5. The vehicle lamp steering mechanism as claimed in claim 1, wherein said transmission gear set comprises a first gearwheel and a second gearwheel, said first gearwheel comprising a large set of teeth and a small set of teeth arranged in a coaxial manner, said second gearwheel comprising a large set of teeth and a small set of teeth arranged in a coaxial manner, the large set of teeth of said second gearwheel being meshed with the small set of teeth of said first gearwheel, the small set of teeth of said second gearwheel being meshed with said output gear.

6. The vehicle lamp steering mechanism as claimed in claim 5, wherein said second gearwheel comprises a stop block located on a top side of the large set of teeth thereof; said lamp housing comprises a bottom plate, and a stop block located on said bottom plate for the stoppage of one of two opposite sides of the stop block of said second gearwheel.

7. The vehicle lamp steering mechanism as claimed in claim 1, further comprising a torsion spring, said torsion spring comprising two opposite ends respectively fastened to said housing and said output gear.

8. The vehicle lamp steering mechanism as claimed in claim 1, further comprising a spring leaf, wherein said eccentric block of said output gear defines therein a coupling hole for receiving said eccentric shaft of said light source; said spring leaf is stopped between an inside wall of said coupling hole and said eccentric shaft.

\* \* \* \* \*